United States Patent [19]

Peebles, Jr.

[11] Patent Number: 4,591,511

[45] Date of Patent: May 27, 1986

[54] ADHESIVE REPAIR PATCH

[75] Inventor: Leighton H. Peebles, Jr., Annandale, Va.

[73] Assignee: The United States of America as represented by the Secretary of the Navy, Washington, D.C.

[21] Appl. No.: 635,866

[22] Filed: Jul. 30, 1984

[51] Int. Cl.⁴ .............................................. B32B 35/00
[52] U.S. Cl. ...................................... 427/142; 156/94; 156/98; 427/386; 427/388.1; 427/409; 427/410; 427/419.5
[58] Field of Search ...................... 427/142, 388.1, 386, 427/409, 410, 419.2, 419.6; 156/94, 98

[56] References Cited

U.S. PATENT DOCUMENTS 4,135,017 1/1979 Hoffman ............................. 156/94
4,473,419 9/1984 Hardy .................................. 156/94

FOREIGN PATENT DOCUMENTS 52-13236 1/1977 Japan .................................. 427/142

Primary Examiner—Sadie L. Childs
Attorney, Agent, or Firm—Robert F. Beers; Arthur A. McGill; Prithvi C. Lall

[57] ABSTRACT

A method for effecting repairs of the damaged components of a machinery in the field which would otherwise require high temperature treatment of the damaged components to form a metal-oxide epoxy joint in a shop. The method includes preparing a repair patch which includes a metal sheet with the metal oxide layer thereon, applying a thin high performance protective coating thereover, covering thereof with a sacrificial backing sheet and then curing the adherent-top coat backing sheet to form a highly durable bonded system which can be stored until needed. At the time of repair the backing sheet is removed by sanding or grit blasting and the adherent is applied to the structure to be repaired under ordinary temperature conditions.

6 Claims, 4 Drawing Figures

ADHESIVE REPAIR PATCH

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is related to adhesive compositions and more particularly to an adhesive joint formation for doing repair work of a damaged metallic portion of an aircraft or the like under field conditions.

(2) Statement of Prior Art

In the production and utilization of articles formed of metals, minor faults are often generated either in the production process itself or as a result of damage in service. Frequently the faults are of such nature that repair would be possible if an economical and otherwise satisfactory repair process existed. Fabrication of adhesive joints to be used to make repairs in the field do not have the durability or moisture resistance of adhesive joints fabricated under controlled conditions because low temperature (less than 200° F.) and low pressures less than (14 lbs. per sq. in.) conditions are used under humid conditions. Under manufacturing conditions, high temperature, high pressure and dry conditions can be used through the use of expensive and massive autoclave facilities. However, in order to conduct repairs in field it is desirable to prepare surfaces in such a manner that more durable field fabrication can be effected than is presently possible. Furthermore, repair of aircraft or like equipment must be accomplished as much as possible on board the aircraft carrier which has limited space, equipment, and talent relative to the manufacturing facilities. Thus the procedure required must be kept simple and straightforward. It is known that metal oxide-epoxy joints are far more susceptible to moisture degradation than the epoxy-epoxy joints. Under field conditions, it is difficult to properly form the metal oxide on repair patches, to apply corrosion and inhibitor coatings and effect the adhesive joint. It is thus desirable to have an improved method by which metal-oxide-epoxy joints are easier to accomplish under field conditions.

SUMMARY OF THE INVENTION

An improved method of adhesive joint formation under field conditions according to the teachings of subject invention includes preparation of the metal-oxide adhered and application of a thin high performance topcoat to the metal oxide adhered. The metal oxide-adhered topcoat is then cured under proper conditions to result in high durability bonded systems. The backing sheet can be applied either before cure or following cure as expedient. The prepared adherend can then be stored until required. At the time when the adherend is needed to repair any system, the backing sheet is removed by sanding or grit blasting, then the joint with the structure requiring repair is prepared under normal field conditions. This method allows strong durable interface regions to be established between the appropriate adherends.

An object of subject invention is to effectuate repairs of metal objects such as aircrafts under field conditions.

Another object of subject invention is to effectuate metal oxide-epoxy joints which are not susceptible to moisture degradation.

Still another object of subject invention is to prepare adherend surfaces in such a manner that more durable field fabrication can be accomplished.

Other object, advantages and novel features of the invention will become apparent from the following detailed description thereof when considered in conjunction with the accompanying drawings wherein:

DESCRIPTION OF THE PREFERRED EMBODIMENT

Figure 1:
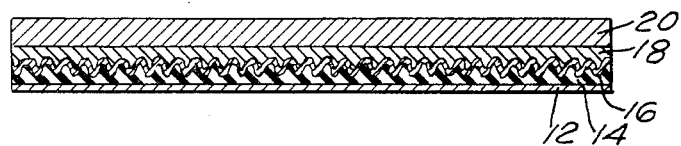
FIG. 1 is a schematic representation of an adhesive repair patch prepared according to the teachings of subject invention.
Figure 2:
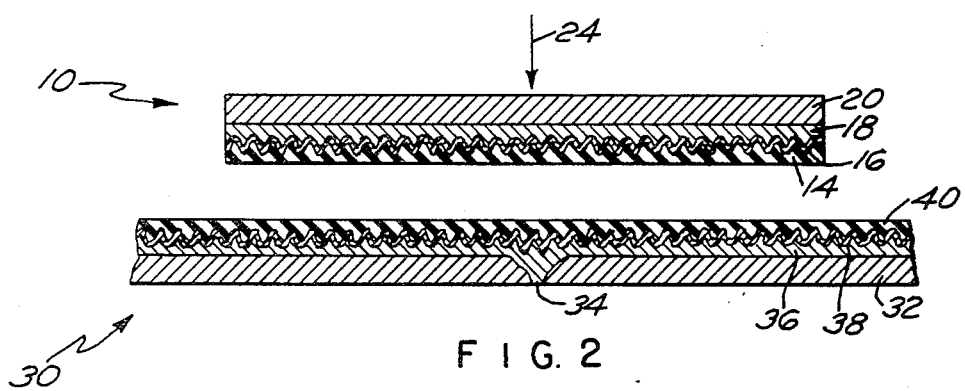
FIG. 2 is a representation of the position of the repair patch of FIG. 1 in relation to the damaged portion as prepared for repair thereof.
Figure 3:
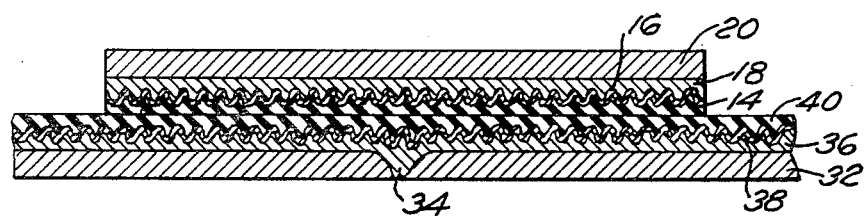
FIG. 3 indicates the relative position of the adhesive repair patch and the prepared damaged surface.
Figure 4:
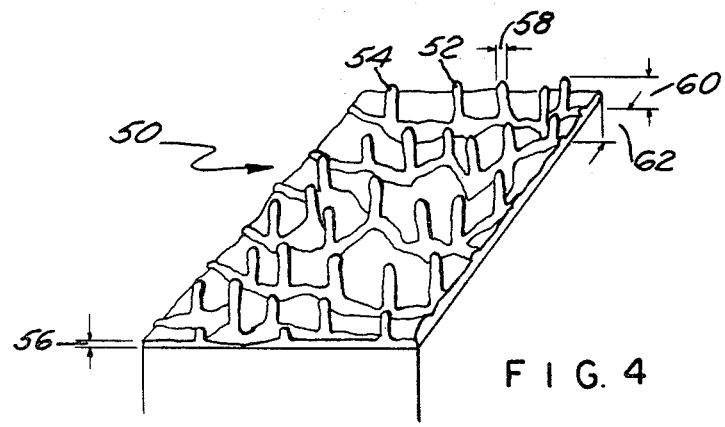
FIG. 4 is a graphical representation of the oxide morphology of a treated aluminum surface.

Referring to the drawings wherein like reference characters designate identical or corresponding parts throughout the several views, and more particularly to FIG. 1 thereof, a prepared adhesive repair patch 10 is shown. A metal piece 20 is prepared and a factory generated oxide layer 18 is prepared under careful laboratory conditions over metal piece 20. Layer 16 of primer is deposited over the oxide layer 18. An adhesive layer 14 is then deposited over the primer layer 16. The adhesive repair is then cured and covered with a sacrificial backing sheet 12. It should be noted that primer layer 16 is basically a coupling agent or an inhibitor for oxide layer 18. There can be a wide variety of choices for such a primer. Furthermore, adhesive layer 14 is in the form of an epoxy. Turning to FIG. 2, the top portion of the adhesive repair patch 10 without protective backing 12 is shown to be in a position where it can be applied to the damaged portion 30 of a machinery by applying pressure along arrow 24. The damaged portion 30 includes the damaged metallic sheet 32 having a hole or opening 34. Sheet 32 is coated with an oxide layer 36 which is further followed by a coating or layer 38 of primer which is in turn covered with epoxy or adhesive layer 40. FIG. 3 shows the relative positions of the repair patch 10 and the damaged section 30 where the adhesive patch 10 after peeling off the protective layer 12 is mated with the damaged portion 30. FIG. 4 shows an aluminum surface 50 with the oxide morphology after the FPL-treatment (Forest Product Laboratory treatment, a well known etching procedure for aluminum) thereof. 52 and 54 indicate the wrinkles on the oxide film having thickness (about 50 Angstrom) the thickness of wrinkles being 58 (about 40 Angstrom), the height of wrinkles being 60 (about 100 Angstrom) and the wrinkles being separated by distance 62 (about 100 Angstrom).

The method used in subject technique basically includes the following steps: patch 10 is prepared under controlled factory conditions, backing sheet is removed by sandblasting to effect roughness to the adherend for mating with low temperature curing epoxy adhesive. The damaged portion of the airplane or like equipment is then prepared and an oxide layer is formed thereon by PASSA-GEL treatment which is a commercially well known treatment. The oxide layer is then coated with a primer which is a coupling agent or inhibiter for protection of oxide layer. The primer is then covered with a low temperature curing epoxy adhesive for mating with the repair patch. In the field, the adhesive repair patch is prepared by peeling off or sandblasting of layer 12 to create a rough surface which is then applied to the damaged portion of the prepared surface of an airplane or the like.

It should be pointed out that the types of oxide layers, primers and epoxy adhesives have not been specifically mentioned as many types of materials can be used for these purposes without deviating from the teachings of subject invention.

Briefly describing the improved method of adhesive joint formation under field conditions includes preparing an adhesive repair patch which comprises a metallic sheet coated with an oxide layer which in turn is coated with a primer acting as an inhibitor followed by an epoxy-adhesive layer which after curing is covered with a protective layer to keep it ready for use. In the field, a damaged portion of an airplane or the like is prepared by forming an oxide layer followed by a layer of primer and an epoxy-adhesive layer. When the protective layer of the adhesive repair patch is removed, the surface of the patch is roughened. It is then pressed on to mate with the prepared surface of the ship, airplane or the like and then cured.

Obviously, many modifications and variations of the present invention are possible in the light of the above teachings. For example, the choice of the metallic sheet used to prepare the adhesive repair patch can vary without deviating from the teachings of subject invention. Furthermore, the use of oxide layer and the material used for forming oxide layer, the primer layer and the adhesive layer can also be varied without deviating from the teachings of subject invention. It is therefore understood that within the scope of the appended claims the invention may be practiced otherwise than as specifically described.

What is claimed is:

1. A process for adhesive joint formation to repair a damaged portion of a machinery including an aircraft which includes the steps of:
    preparing a repair patch under controlled conditions by forming an oxide layer on a metallic sheet and covering said oxide layer with an inhibitor layer;
    forming a protective backing for storing said repair patch for use to repair the damaged portion under field conditions;
    preparing said portion of said machinery including putting an adhesive layer thereon;
    mating said repair patch after removing protective backing thereof with the damaged portion of said machinery; and
    curing the adhesive layer on the damaged portion of said machinery.

2. The process of claim 1 wherein the step of preparing a repair patch further includes forming an adhesive layer over said inhibitor.

3. The process of claim 2 wherein the step of preparing a repair patch further includes applying a protective layer over said adhesive layer for storing the repair patch for use under field conditions.

4. The process of claim 1 wherein the step of preparing the damaged portion of said machinery includes forming an oxide layer on said damaged portion.

5. The process of claim 4 wherein the step of preparing the damaged portion of said machinery further includes forming an inhibitor layer on the oxide layer.

6. The process of claim 5 wherein the step of preparing the damaged portion of said machinery further includes forming an adhesive layer over said inhibitor layer.

* * * * *